Sept. 26, 1967  J. A. KNOX ET AL  3,343,602
METHOD OF RETARDING REACTION OF ACID ON LIMESTONE
Filed Oct. 23, 1965
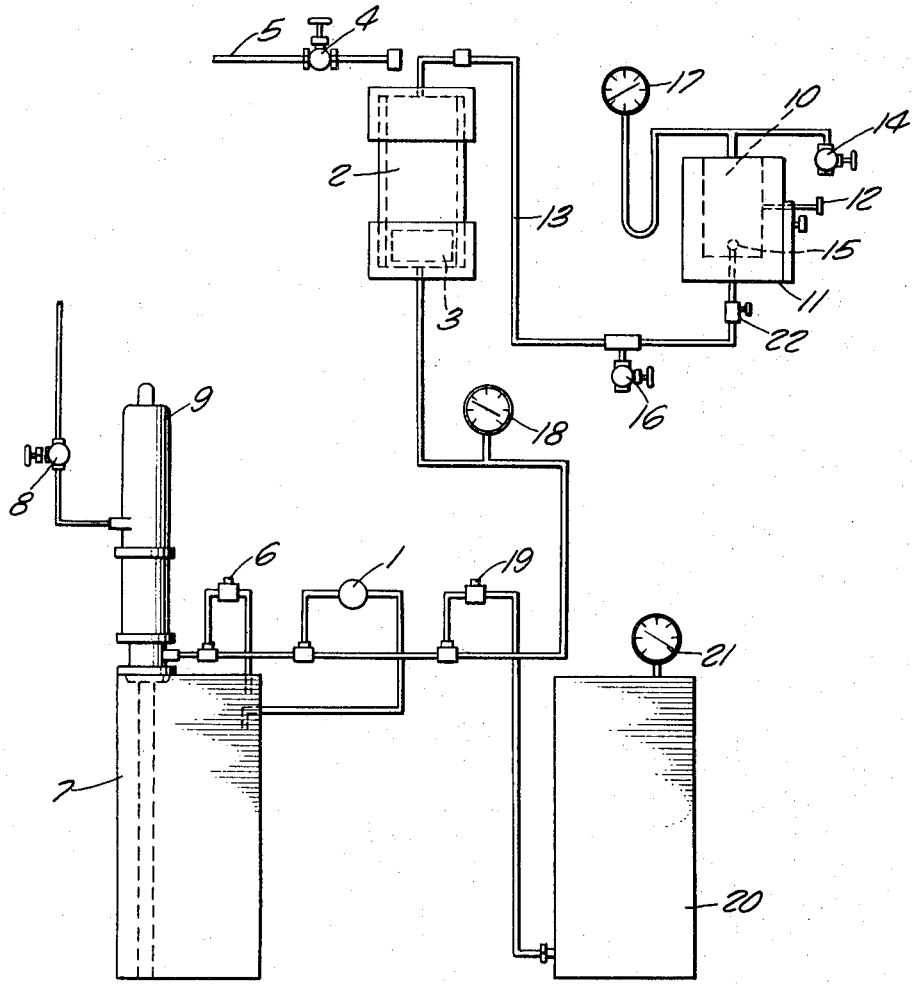
JOHN A. KNOX
WALTER R. DILL
INVENTORS.
BY Lyon & Lyon
ATTORNEYS

United States Patent Office 3,343,602
Patented Sept. 26, 1967

3,343,602
METHOD OF RETARDING REACTION OF
ACID ON LIMESTONE
John A. Knox and Walter R. Dill, Duncan, Okla., assignors to Halliburton Company, Duncan, Okla., a corporation of Delaware
Filed Oct. 23, 1965, Ser. No. 503,069
19 Claims. (Cl. 166—42)

This invention relates to a method of retarding the reaction of acid on calcareous formations by pretreating the formations with an oily solution containing an oil film-forming agent.

Calcareous formations containing gas, oil or water are often treated with acid to increase the productivity of such minerals from the underground reservoir. The acid promotes the removal of any plugging material from naturally occurring fractures and increases the size of the fractures. The introduction of the acid itself may also create fractures, with the acid acting to etch such fractures so that they remain open and have a high fracture flow capacity.

The rate at which the acid reacts with the calcareous earth formation, is a function of various factors including acid concentration, temperature, velocity, the particular type of calcareous material or rock, and the rock surface area to acid volume ratio. Thus, in acid treatment of wells, the acid can be pumped only a certain distance into the formation before the acid becomes spent. The time required for the acid to become spent is generally referred to as the reaction time. If spent acid is pumped further into the formation, the fluid may cause the fracture to be extended, but it will not increase the flow capacity in the fracture and the fracture extension may close completely when the pressure is relieved.

The importance of extending this reaction time can readily be seen. Accordingly, it is the principal object of the present invention to provide a means of extending this reaction time.

It is a further object of the present invention to retard the reaction of acid on calcareous formations particularly limestone by pretreating the formation with an oil solution containing an oil film-forming agent.

These and other objects and advantages of the invention will be apparent from the following more detailed description and the accompanying drawing.

Briefly, the present invention comprises the method of rendering the calcareous formation surface oil wet by forming thereon prior to contact with acid, a tenacious film comprising an oil and an oil film-forming agent. According to the present invention, it has been found that the oil film-forming agent is uniquely effective in promoting and maintaining an oily film on the surfaces of the calcareous formation. The oily film produced by the method of this invention serves to substantially decrease the reaction rate of the acid with the calcareous formation during acidizing. The precise mechanism whereby the oily film is formed on the formation and then functions in the presence of acid is not fully understood. However, as those skilled in the art will readily appreciate, the method of this invention is of major significance in increasing the benefits obtainable by well acidizing and fracture acidizing.

The compounds most effective as oil film-forming agents are any oil soluble or partially oil soluble wetting agents including the film-forming down hole corrosion inhibitors generally used for preventing corrosion of well equipment. Typical of these materials are the primary and secondary amine salts of fatty acids and naphthenic acids. Other compounds which may be used for this purpose include the long chain oil soluble or slightly oil soluble amines, long chain oil soluble quaternary ammonium compounds, long chain oil soluble or slightly oil soluble sulfonic acids and salts thereof including salts of bi- and tri-metallic salts, and long chain oil soluble organic acids. Any other wetting agents having similar solubility properties may be used.

The oil film-forming agents are employed in the oil medium in an effective amount sufficient to provide a tenacious oily film on the calcareous formation, usually on the order of from about 0.3% to 25% by weight of the medium. In general the oil medium containing the oil film-forming agents is supplied by placing an oil solution of the agent into the formation adjacent the bore hole of a well traversing the producing zone ahead of the acid. The oil medium can be heated prior to injection into the formation to improve penetration, although this procedure is not essential. The oil medium will penetrate the pore spaces and fractures present in the formation or fractures made during treatment, and form a protective oily coating prior to the time that the acid contacts these same pores and fractures. It is believed that the film remains to provide a retarded effect by preventing contact of the acid with these pores and fractures for a period of time. This period of time will vary depending on the tenacity of the film but will, in all instances, require a longer time for the acid to spend than would be required if the film were not present.

The acid used subsequent to the formation of the film on the calcareous surface may be any of those conventionally used in well acidizing including hydrochloric acid, hydrofluoric acid, acetic acid, formic acid, mixtures thereof, and combinations of one or more such acids with surface active agents including any of those disclosed in assignee's copending U.S. patent application Ser. No. 399,251, now Patent No. 3,319,714 the disclosure of which is incorporated herein by reference. The use of the surface active agents in the acid also retards the acid reaction with calcareous formations. Thus, by the practice of our invention, a double retarding effect can be obtained.

The reaction time is the time required for the acidizing fluid to react to a given unreacted acid concentration. The reaction time is necessary to determine the most effective acidizing volume. To measure the reaction time, the formation is first crushed and screened. The equipment used in measuring the reaction time is shown in the drawing. To determine the reaction time, the reaction chamber 10 is packed with the size particles that give the surface area-volume ratio equivalent to the fracture width to be used. The voids are filled with crude oil from the formation to be treated. If the crude oil is not available, kerosene may be used. Before the equipment is placed in operation the adjustable pop off valve 1 is set to release at a pressure of approximately 2000 p.s.i. The pop off valve is set by sealing the fluid chamber 2 with its piston 3 down (air pressure regulated by valve 4 in line 5 is used to force the piston down) to provide an air cushion to pump against. This prevents a sudden jump in pressure, however, special care should be observed because the pressure build up will still be rapid. The adjustable pop off valve 1 is opened completely (by turning counterclockwise). The pressure release valve 6 that bleeds oil back into the oil reservoir 7 is closed and the pump is started by slowly opening the valve 8 in the air line to the pump 9 while pumping, the pressure gauge between the pump and fluid chamber 2 should be observed carefully and the operator should be ready to stop the pump quickly. While pumping, slowly close the adjustable pop off valve 1 (by turning clockwise) until 2000 p.s.i. is maintained without an additional buildup in pressure.

The filled chamber is placed in the heating jacket 11 which has been adjusted to the temperature of the formation to be treated, as indicated by thermometer 12. When the reaction chamber and its contents reach the test temperature, the cap is removed from the test fluid chamber 2 and the chamber is filled with the acidizing fluid. The cap is replaced on the test fluid chamber. The line 13 between the reaction chamber and the test fluid chamber is then placed in the system, the outlet valve 14 from the reaction chamber is closed, the seat valve 15 in the base of the reaction chamber is opened, the pressure release valve 16 between the fluid chamber and the reaction chamber is closed, and the system is brought up to pressure indicated at 17.

This is accomplished by closing the pressure release valve 6 in the line leading back to the oil reservoir 7, and opening the valve 6 in the air line to the pump 9. The pump should be operated slowly until the gauge 18 between the pump and fluid chamber registers 1000 p.s.i. (the same pressure as shown by the gauge on the accumulator tank). The valve 19 in the line to the nitrogen accumulator tank 20 is opened. The accumulator tank 20 is fitted with pressure gauge 21, and allows continuous operation of the pump without a sudden build up in pressure, or drop in pressure when filling the reaction chamber.

While the pump is operating, the outlet valve 14 on the reaction chamber 10 is opened so that the acidizing fluid displaces the oil from the reaction chamber as rapidly as possible. When the oil has been displaced, the outlet valve 14 of the reaction chamber is closed and the stop watch is started to record the reaction time.

The valve 15 in the base of the reaction chamber and the valve 19 in the line to the accumulator tank 20 are closed, the pressure release valve 6 to the oil reservoir 7 is opened, the pressure release valve 16 between the fluid chamber 2 and the reaction chamber 10 is opened, and the line is disconnected from the reaction chamber at the quick disconnect 22.

When the test period is almost complete, the valve 15 in the base of the reaction chamber 10 is opened slightly to flush unreacted acid from the stem. This unreacted acid is discarded. A sample is then taken as quickly as possible. If the reaction time of a thin acid is being measured, a series of samples may be taken. After the sample has been taken, it is examined for formation fines which would let the acid continue to react. If fines are detected, an aliquot of the acid is transferred to another container to prevent further acid reaction. After cooling the sample, an aliquot of the acid is titrated with a standard base, such as 0.2 N sodium hydroxide, to the end point. The product of the volume of base required for neutralization and the normality of the base yields the normality of the acid in the acid aliquot. This normality may be readily converted to the percent unreacted acid in the aliquot.

The following examples are merely illustrative and should not be regarded as limiting in any way.

EXAMPLE 1

Following the procedure above-described, reaction time tests were conducted at 200° F., 1500 p.s.i., using Bedford limestone core plugs cut to simulate a 0.24 inch fracture. The cores were pre-heated in kerosene containing 1.0% of the chemical additive. The 15% HCl used contained 0.3% by weight of a wetting agent comprising, by volume, 4.00 parts propargyl alcohol, 1.50 parts ethyl octynol, 3.00 parts diacetone alcohol and 0.34 parts of a mixture of high boiling alkylpyridines having an equivalent weight of about 170. The times shown are those required to reach an acid concentration of 3.2%.

DATA

| Chemical in Kerosene Pre-Flush | Acid Solution, percent HCl | Acid Reaction Time (min.) |
|---|---|---|
| None | 15 | 17 |
| 1.0% Magna 67 | 15 | 30 |
| 1.0% Kontol 147 | 15 | 17 |
| 1.0% Cronox 225 | 15 | 38 |

EXAMPLE 2

As is shown in the following data, the time required for acid to spend on rock (Bennett's Chat) screened to simulate a 0.1 inch fracture contacted by the oil solution containing the oil film-forming agent is four to six times longer than the reaction time obtains when only kerosene was used to wet the rock before contacting it with 15% hydrochloric acid. The times listed are those required to reach a spent acid concentration of 2.0%.

REACTION TIMES

| Surfactants in Oil | Percent | Surfactant in Acid | Percent | °F. | Acid Reaction Time (min.) |
|---|---|---|---|---|---|
| No Additive | | | | 100 | 6 |
| Kontol 147 | 10 | | | 140 | 21 |
| Magna 67 | 10 | | | 140 | 25 |
| Barium Propionate | 10 | | | 140 | 8.5 |
| Magna 67 | 10 | (1) | 0.5 | 140 | 24 |
| Kontol 147 | 10 | (1) | 0.5 | 140 | 25 |
| Magna 67 | 10 | (2) | 0.5 | 140 | 9 |
| Kontol 147 | 10 | (2) | 0.5 | 140 | 15 |
| Magna 67 | 10 | (3) | 1.0 | 140 | 36 |
| Kontol 147 | 10 | (3) | 1.0 | 140 | 33 |
| Magna 67 | 10 | (3) | 0.15 | 140 | 33 |
| Kontol 147 | 10 | (3) | 0.15 | 140 | 31 |
| Magna 67 | 10 | | | 200 | 19.5 |
| Kontol 147 | 10 | | | 200 | 13 |
| No Additive | 10 | | | 200 | 3 |

[1] A sodium alkyl sulfonate wetting anionic agent.
[2] A cationic-monionic blend of surface active agents.
[3] A wetting agent comprising, by volume, 3.0 parts hexynol, 2.0 parts of a mixture of high boiling alkylpyridines having an equivalent weight of about 170, and 1.0 parts ethyl octynol.

The foregoing data clearly illustrate the major increase in the reaction time, and hence the decrease in the reaction rate, of acid following treatment of calcareous materials by the method of this invention.

EXAMPLE 3

The reaction times were measured as indicated above at 2006 F. and 1500 p.s.i. with two dolomite and Bedford limestone cores, cut to simulate a 0.34 inch fracture. Other tests were conducted at 140° F., 1500 p.s.i. with Bennett's Chat screened to simulate a 0.1 inch fracture. The cores were pre-heated for two hours in tall oil containing the sodium salt of oleic acids, 1.0% Cronox 225, in kerosene containing 1.0% Cronox 225, and in kerosene containing Adomite Mark II (50 lbs./1000 gals.) and 1.0% Cronox 225. The chat was pre-heated in kerosene containing 0.1% Cronox 225. The acid solution in all instances was 15% HCl containing 0.1% by weight of a wetting agent comprising, by volume, 3.0 parts hexynol, 2.0 parts of a mixture of high boiling alkylpyridines having an equivalent weight of about 170, and 1.0 part ethyl octynol. The reaction time listed is the time required for the acid to react to a residual concentration of 3.2%.

DATA

Bedford Limestone

Pre-heated fluid:     Acid reaction time, min.
    Kerosene _____ 20
    Kerosene+1.0% Cronox 225 _____ 12
    Tall oil containing the Na salt of oleic acid
      +1.0% Cronox 225 _____ 33
    Kerosene+Adomite Mark II (50 lbs./1000
      gals.)+1.0% Cronox 225 _____ 19

Beekman Dolomite

Pre-heated fluid:     Acid reaction time, min.
    Kerosene _____ 38
    Kerosene+1.0% Cronox 225 _____ 38
    Tall oil containing the Na salt of oleic acid
      +1.0% Cronox 225 _____ 33
    Kerosene+Adomite Mark II (50 lbs./1000
      gals.)+1.0% Cronox 225 _____ 25

Wichita Albany Dolomite

Pre-heated fluid: Acid reaction time, min.
    Kerosene+1.0% Cronox 225 _____ 16

Bennett's Chat

Pre-heated fluid: Acid reaction time, min.
    Kerosene _____ 32
    Kerosene+1.0% Cronox 225 _____ 62

Reaction time tests were conducted at 200° F., 1500 p.s.i., using Bedford limestone cores cut to simulate a 0.24 inch fracture. The cores preheated with the preflush fluid for 2 hours. The reaction time listed is the time required for the acid to react to a residual concentration of 3.2%. The following reaction times were obtained at 200° F. using the preflush fluids listed. The acidizing fluid was 15% HCl containing 0.3% of the additive employed in Example 1.

DATA

| Preflush Fluid | °F. | Reaction Time (min.) |
|---|---|---|
| Kerosene | 200 | 15 |
| Kerosene+1.0% Fractionated Tall Oil Fatty Acid | 200 | 65 |
| Kerosene+1.0% Fractionated Tall Oil Fatty Acid and 1.0% Acetic Acid | 200 | 60 |
| Kerosene+1.0% Cronox 225 and 1.0% Acetic Acid | 200 | 40 |
| HV-60 [1] 1.0% Cronox 225 in oil phase | 200 | 22 |
| Kerosene+1.0% Silicon Surfactant [2] | 200 | 20 |

[1] An oil-brine emulsion.
[2] Sold under tradename L-530 by Union Carbide.

EXAMPLE 4

The reaction times were determined at 200° F., 1500 p.s.i., using Bedford core plugs cut to simulate a 0.24 inch fracture. The cores were allowed to preheat in kerosene for 2 hours before running the test. The reaction time listed is the time required for the 15% hydrochloric acid to react to a residual concentration of 2.0%.

DATA

| Pre-Heated Fluid | Dolomite | Acid Reaction Time (min.) |
|---|---|---|
| Kerosene+1.0% Cronox 225 | Kasota | 57 |
| Do | Rochester | 18 |

Kontol 147 is a Tretolite product and is composed of mixed salts of high molecular weight cyclic amidine and mono- and poly-carboxylic acids and oxyalkylated fatty acids. The active ingredients are dissolved in an aromatic solvent and alcohol. Magna 67 is a high molecular weight diamine salt of a fatty acid dissolved in a hydrocarbon solvent. Adomite Mark II is a calcium salt of postdodecylbenzene overhead sulfonate. Cronox 225 is an Aquaness product comprising a blend of a 35% active solution of an amine salt, a 70% active solution of an alkyd resin, and a complex nonionic high molecular weight ester.

While particular reference has been made to the use of kerosene or tall oil as the oily component in the pretreating fluids of this invention, it will be understood that any oily material capable of being pumped into the formation is suitable including mineral and diesel oils. The selection of an oil film-forming agent for use with any particular oil to be injected in a given type of formation can be readily determined by those skilled in the art. In general, the oil used has a viscosity about the same as kerosene.

One significant improvement on the method of our invention involves the placing of a fluid loss additive in the oil—oil wetting agent solution preflush to allow deeper penetration of the oil film-forming solution into a fracture before complete loss of the material due to the porosity of the formation. The placement of the oil film-forming medium the day of or several days before an acid job is envisioned as part of the method of our invention.

It will be readily understood to those skilled in the art that the oily fluids and/or acidizing fluids used in the process of our invention are injected into the formation around the bore hole in the same manner as with other well treating fluids, the fluids being pumped into the well and out into the formation at the desired location utilizing well-known methods and equipment. After injection of the fluids into the formation, the well may be closed in, for example, to allow time for the acid to attack the formation. The fluids may be withdrawn as by pumping, bailing or producing of the well.

Having fully described the invention, it is intended that it be limited only by the lawful scope of the appended claims.

We claim:

1. A method of chemically retarding the reaction time of acid solutions on calcareous formations, comprising the steps of contacting the calcareous formation to be acidized with an oily fluid comprising an oil and an oil film-forming agent in an amount effective to provide a tenacious oily film on the calcareous formation whereby the reaction time of acid on the calcareous formation is substantially increased, and thereafter contacting the calcareous formation with an aqueous acidizing fluid.

2. A method of fracture acidizing a calcareous formation surrounding the bore hole of a well which comprises the steps of injecting into the formation an oily fluid comprising an oil and at least partially oil soluble wetting agent in an amount effective to provide a tenacious oily film on the calcareous formation whereby the reaction time of acid on the calcareous formation is substantially increased, and thereafter injecting into the calcareous formation an aqueous acidizing fluid.

3. A method of chemically retarding the reaction time of acid solutions on calcareous formations, comprising the steps of contacting the calcareous formation to be acidized with an oily fluid comprising an oil and a long chain oil soluble amine salt of a fatty acid in an amount effective to provide a tenacious oily film on the calcareous formation whereby the reaction time of acid on the calcareous formation is substantially increased, and thereafter contacting the calcareous formation with an aqueous acidizing fluid.

4. A method of chemically retarding the reaction time of acid solutions on calcareous formations, comprising the steps of contacting the calcareous formation to be aciacidized with an oily fluid comprising an oil and a long chain oil soluble quaternary ammonium compound in an amount effective to provide a tenacious oily film on the calcareous formation whereby the reaction time of acid on the calcareous formation is substantially increased, and thereafter contacting the calcareous formation with an aqueous acidizing fluid.

5. A method of chemically retarding the reaction time of acid solutions on calcareous formations, comprising the steps of contacting the calcareous formation to be acidized with an oily fluid comprising an oil and a long chain oil soluble organic acid in an amount effective to provide a tenacious oily film on the calcareous formation whereby the reaction time of acid on the calcareous formation is substantially increased, and thereafter contacting the calcareous formation with an aqueous acidizing fluid.

6. A method of chemically retarding the reaction time of acid solutions on calcareous formations, comprising the steps of contacting the calcareous formation to be acidized with an oily fluid comprising an oil and an oil soluble wetting agent in an amount effective to provide a tenacious oily film on the calcareous formation whereby the reaction time of acid on the calcareous formation is substantially increased, and thereafter contacting the calcareous formation with an aqueous acidizing fluid.

7. The method of chemically retarding the reaction time of acid solutions on calcareous formations surrounding the bore hole of a well traversing a producing zone which comprises the steps of contacting the calcareous formation to be acidized with a mixture containing an oil and from about 0.3% to about 25% by weight of an oil film-forming agent, and subsequently contacting the calcareous formation with an aqueous acidizing fluid.

8. A method of chemically retarding the reaction time of acid solutions on calcareous formations, comprising the steps of contacting the calcareous formation to be acidized with an oily medium comprising an oil and an oil film-forming agent in an amount effective to provide a tenacious oily film on the calcareous formations, whereby the reaction time of acid on the calcareous formation is substantially increased, and thereafter contacting the calcareous formation with a hydrochloric acid.

9. The method of chemically retarding the reaction time of acid solutions on calcareous formations surrounding the bore hole of a well traversing a producing zone which comprises the steps of contacting the calcareous formation to be acidized with a mixture containing an oil and from about 0.3% to about 25% by weight of an oil film-forming agent, and subsequently contacting the calcareous formation with aqueous hydrochloric acid.

10. The method of claim 1 wherein the aqueous acidizing fluid contains a surface active agent.

11. The method of claim 7 wherein the aqueous acidizing fluid contains a surface active agent.

12. A method of chemically retarding the reaction time of acid solutions on calcareous formations, comprising the steps of contacting the calcareous formation to be acidized with an oily fluid comprising kerosene and an oil film-forming agent in an amount effective to provide a tenacious oily film on the calcareous formation whereby the reaction time of acid on the calcareous formation is substantially increased, and thereafter contacting the calcareous formation with an aqueous acidizing fluid.

13. The method of chemically retarding the reaction time of acid solutions on calcareous formations surrounding the bore hole of a well traversing a producing zone which comprises the steps of contacting the calcareous formation to be acidized with a mixture containing kerosene and from about 0.3% to about 25% by weight of an oil film-forming agent, and subsequently contacting the calcareous formation with an aqueous acidizing fluid.

14. A method of chemically retarding the reaction time of acid solutions on calcareous formations, comprising the steps of contacting the calcareous formation to be acidized with an oily fluid comprising an oil and a sodium salt of oleic acid in an amount effective to provide a tenacious oily film on the calcareous formation whereby the reaction time of acid on the calcareous formation is substantially increased, and thereafter contacting the calcareous formation with an aqueous acidizing fluid.

15. A method of chemically retarding the reaction time of acid solutions on calcareous formations, comprising the steps of contacting the calcareous formation to be acidized with an oily fluid comprising an oil and a calcium salt postdodecylbenzene overhead sulfonate in an amount effective to provide a tenacious oily film on the calcareous formation whereby the reaction time of acid on the calcareous formation is substantially increased, and thereafter contacting the calcareous formation with an aqueous acidizing fluid.

16. A method of chemically retarding the reaction time of acid solutions on calcareous formations, comprising the steps of contacting the calcareous formation to be acidized with an oily fluid comprising an oil and a tall oil fatty acid in an amount effective to provide a tenacious oily film on the calcareous formation whereby the reaction time of acid on the calcareous formation is substantially increased, and thereafter contacting the calcareous formation with an aqueous acidizing fluid.

17. A method of chemically retarding the reaction time of acid solutions on calcareous formations, comprising the steps of contacting the calcareous formation to be acidized with an oily fluid comprising an oil and mixed salts of high molecular weight cyclic amidine, monocarboxylic, polycarboxylic and oxyalkylated fatty acids in an amount effective to provide a tenacious oily film on the calcareous formation whereby the reaction time of acid on the calcareous formation is substantially increased, and thereafter contacting the calcareous formation with an aqueous acidizing fluid.

18. A method of chemically retarding the reaction time of acid solutions on calcareous formations, comprising the steps of contacting the calcareous formation to be acidized with an oily fluid comprising an oil and a high molecular weight diamine salt of a fatty acid in an amount effective to provide a tenacious oily film on the calcareous formation whereby the reaction time of acid on the calcareous formation is substantially increased, and thereafter contacting the calcareous formation with an aqueous acidizing fluid.

19. A method of chemically retarding the reaction time of acid solutions on limestone formations, comprising the steps of contacting the limestone formation to be acidized with an oily fluid comprising an oil and an oil film-forming agent in an amount effective to provide a tenacious oily film on the limestone formation whereby the reaction time of acid on the limestone formation is substantially increased, and thereafter contacting the limestone formation with an aqueous acidizing fluid.

References Cited

UNITED STATES PATENTS

| | | | |
|---|---|---|---|
| 2,345,713 | 4/1944 | Moore et al. | 166—42 |
| 2,354,203 | 7/1944 | Garrison | 166—42 |
| 2,908,643 | 10/1959 | Thompson et al. | 166—42 X |
| 2,910,436 | 10/1959 | Fatt et al. | 166—42 X |
| 3,251,415 | 5/1966 | Bombardier et al. | 166—42 |
| 3,254,718 | 6/1966 | Dunlap | 166—42 |

CHARLES E. O'CONNELL, *Primary Examiner.*

DAVID H. BROWN, *Examiner.*